United States Patent
Akiyama

(10) Patent No.: US 10,725,721 B2
(45) Date of Patent: Jul. 28, 2020

(54) DISPLAY DEVICE, STORAGE MEDIUM STORING CONTROL PROGRAM, AND CONTROL METHOD

(71) Applicant: SHARP KABUSHIKI KAISHA, Sakai, Osaka (JP)

(72) Inventor: Motohiro Akiyama, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/168,733

(22) Filed: Oct. 23, 2018

(65) Prior Publication Data
US 2019/0121594 A1   Apr. 25, 2019

(30) Foreign Application Priority Data
Oct. 25, 2017  (JP) ................... 2017-205941

(51) Int. Cl.
| G06F 3/14 | (2006.01) |
| H04N 5/445 | (2011.01) |
| H04N 21/485 | (2011.01) |
| G06F 3/044 | (2006.01) |
| G06F 3/041 | (2006.01) |
| G09G 5/14 | (2006.01) |

(52) U.S. Cl.
CPC ............ *G06F 3/1423* (2013.01); *G06F 3/044* (2013.01); *G06F 3/0416* (2013.01); *G06F 3/1438* (2013.01); *G09G 5/14* (2013.01); *H04N 5/44591* (2013.01); *H04N 21/4858* (2013.01); *G06F 3/1446* (2013.01); *G09G 2340/04* (2013.01); *G09G 2370/20* (2013.01); *G09G 2370/22* (2013.01)

(58) Field of Classification Search
CPC ........................................ G09G 5/14
See application file for complete search history.

(56) References Cited

U.S. PATENT DOCUMENTS

2018/0027175 A1*  1/2018  Cho ................ G01C 11/02
                                                348/584

FOREIGN PATENT DOCUMENTS

JP           2008-046762 A      2/2008

* cited by examiner

*Primary Examiner* — Roy P Rabindranath
(74) *Attorney, Agent, or Firm* — ScienBiziP, P.C.

(57) ABSTRACT

An information processing system includes a CPU, computers, and a display device that displays a display screen including videos or images transmitted from the computers on a display. The display device includes a first input port to a fourth input port for receiving a video signal transmitted from each of the computers and a first output port to a fourth output port for outputting an operation signal to each of the computers. The CPU outputs a detection signal for changing the image to each of the first output port to the fourth output port, detects a change in the image on the display screen, and sets a combination of the output port that has output the detection signal and the input port corresponding to the display screen in which the image has changed.

7 Claims, 10 Drawing Sheets

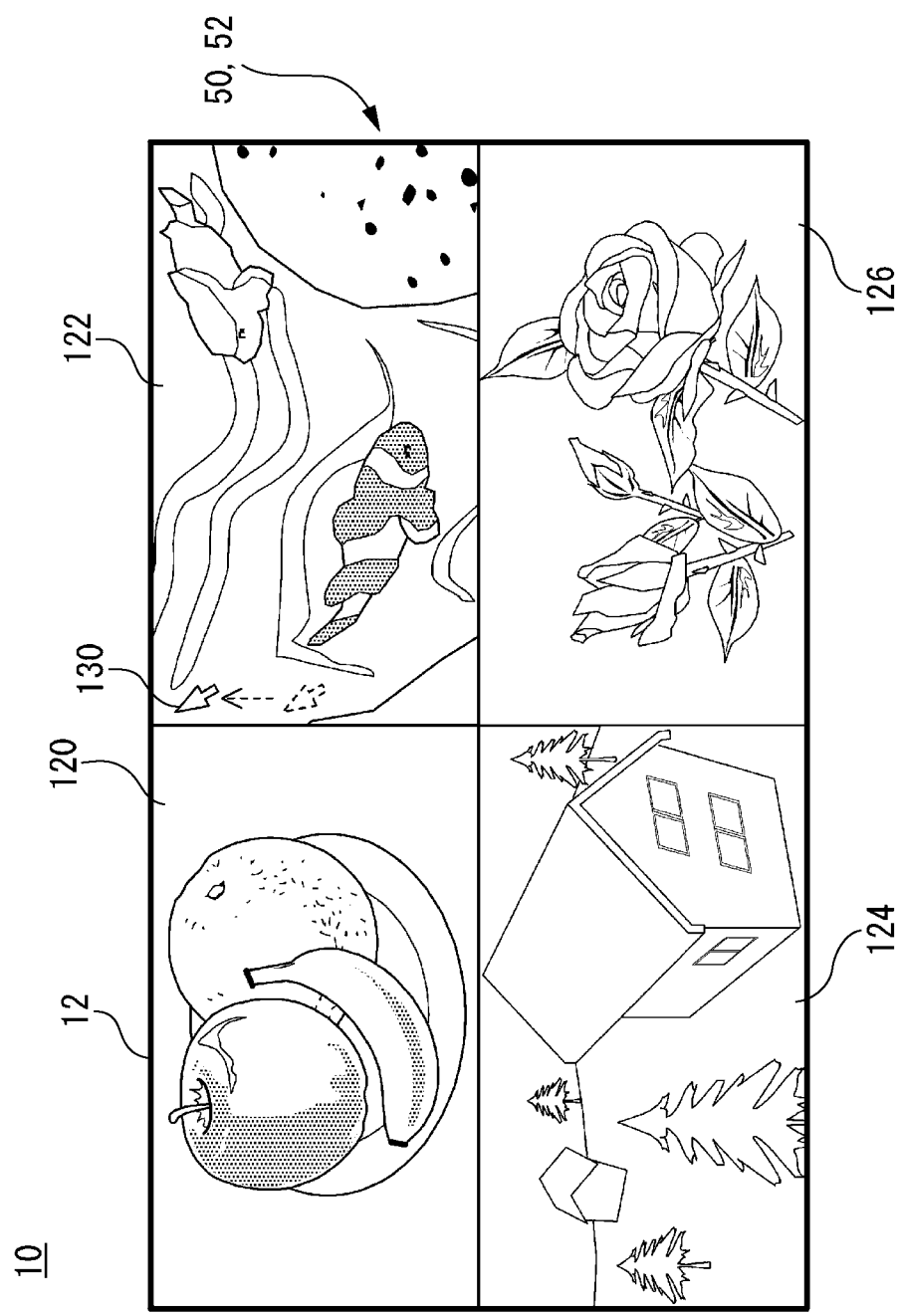

FIG. 5

| SUB-SCREEN | INPUT PORT | OUTPUT PORT |
|---|---|---|
| FIRST SUB-SCREEN | FIRST INPUT PORT | FIRST OUTPUT PORT |
| SECOND SUB-SCREEN | SECOND INPUT PORT | SECOND OUTPUT PORT |
| THIRD SUB-SCREEN | THIRD INPUT PORT | THIRD OUTPUT PORT |
| FOURTH SUB-SCREEN | FOURTH INPUT PORT | FOURTH OUTPUT PORT |

FIG. 6

| SUB-SCREEN | INPUT PORT | OUTPUT PORT |
|---|---|---|
| FIRST SUB-SCREEN | FIRST INPUT PORT | THIRD OUTPUT PORT |
| SECOND SUB-SCREEN | SECOND INPUT PORT | FIRST OUTPUT PORT |
| THIRD SUB-SCREEN | THIRD INPUT PORT | SECOND OUTPUT PORT |
| FOURTH SUB-SCREEN | FOURTH INPUT PORT | FOURTH OUTPUT PORT |

DISPLAY DEVICE, STORAGE MEDIUM STORING CONTROL PROGRAM, AND CONTROL METHOD

BACKGROUND

1. Field

The present disclosure relates to a display device, a storage medium storing a control program, and a control method, and in particular, for example, to a display device including multiple input/output units, a storage medium storing a control program, and a control method.

2. Description of the Related Art

An example of a switching device of the related art is disclosed in Japanese Unexamined Patent Application Publication No. 2008-46762, The switching device disclosed in Japanese Unexamined Patent Application Publication No. 2008-46762 includes a switching unit that establishes an electrical connection between a desired one of multiple computers and a desired one of multiple input/output devices by switching the electrical connection between the computers and the input/output devices each having a touch panel in response to an operation of a user.

However, in the switching device disclosed in Japanese Unexamined Patent Application Publication No. 2008-46762, since there are multiple systems of computers and input/output devices, combinations of the computers and the input/output devices become complicated, and a user may not be able to select a correct combination at all times. Therefore, in a case where the user is not able to select a correct combination, the user may switch the connection until the user selects a correct combination or may check to which connection port of the switching device each computer and each input/output device are connected, which is troublesome.

It is desirable to provide a display device, a storage medium storing a control program, and a control method.

It is also desirable to provide a display device, a storage medium storing a control program, and a control method capable of combining a video input and an operation output with a simple operation.

SUMMARY

According to an aspect of the disclosure, there is provided a display device conmunicably connectable to each of two or more information terminals and including a display unit, two or more input ports, two or more output ports, a display control unit, a detection signal output unit, a detection unit, and a connection setting unit. The two or more input ports correspond respectively to the two or more information terminals and receive a video signal transmitted from each of the two or more information terminals. The two or more output ports correspond respectively to the two or more information terminals and output an operation signal to each of the two or more information terminals. The display control unit causes the display unit to display a display screen including an image corresponding to the video signal input to at least one input port among the two or more input ports. The detection signal output unit causes each of the two or more output ports to sequentially output a detection signal for changing the image. The detection unit detects a change of the image included in the display screen. The connection setting unit sets a combination of a setting output port from which the detection signal is output when the image has changed among the two or more output ports and the at least one input port to which the video signal corresponding to the image displayed on the display unit is input when the image has changed, in a case where the detection unit detects the change of the image.

According to another aspect of the disclosure, there is provided a non-transitory storage medium storing a control program of a display device communicably connectable to each of two or more information terminals and including a display unit, two or more input ports corresponding respectively to the two or more information terminals and receiving a video signal transmitted from each of the two or more information terminals, two or more output ports corresponding respectively to the two or more information terminals and outputting an operation signal to each of the two or more information terminals, the control program causing a processor of the display device to function as a display control unit of causing the display unit to display a display screen including an image corresponding to the video signal input to at least one input port among the two or more input ports, a detection signal output unit of causing each of the two or more output ports to sequentially output a detection signal for changing the image, a detection unit of detecting a change of the image included in the display screen, and a connection setting unit of setting a combination of a setting output port from which the detection signal is output when the image has changed among the two or more output ports and the at least one input port to which the video signal corresponding to the image displayed on the display unit is input when the image has changed, in a case where the detection unit detects the change of the image.

According to still another aspect of the disclosure, there is provided a control method including causing a processor of a display device communicably connectable to each of two or more information terminals and including a display unit, two or more input ports corresponding respectively to the two or more information terminals and receiving a video signal transmitted from each of the two or more information terminals, two or more output ports corresponding respectively to the two or more information terminals and outputting an operation signal to each of the two or more information terminals, to execute: (a) causing the display unit to display a display screen including an image corresponding to the video signal input to at least one input port among the two or more input ports; (b) causing each of the two or more output ports to sequentially output a detection signal for changing the image; (c) detecting a change of the image included in the display screen, and (d) setting a combination of a setting output port from which the detection signal is output when the image has changed among the two or more output ports and the at least one input port to which the video signal corresponding to the image displayed on the display unit is input when the image has changed, in a case where the change of the image is detected in the (c).

BRIEF DESCRIPTION OF THE DRAWINGS

FIG. 4 is a diagram illustrating an example of an operation example of the information processing system;

FIG. 5 is an illustrative diagram illustrating an example of a provisional connection setting table;

FIG. 6 is an illustrative diagram illustrating an example of the connection setting table after automatic setting;

DESCRIPTION OF THE EMBODIMENTS

First Example

Figure 1:
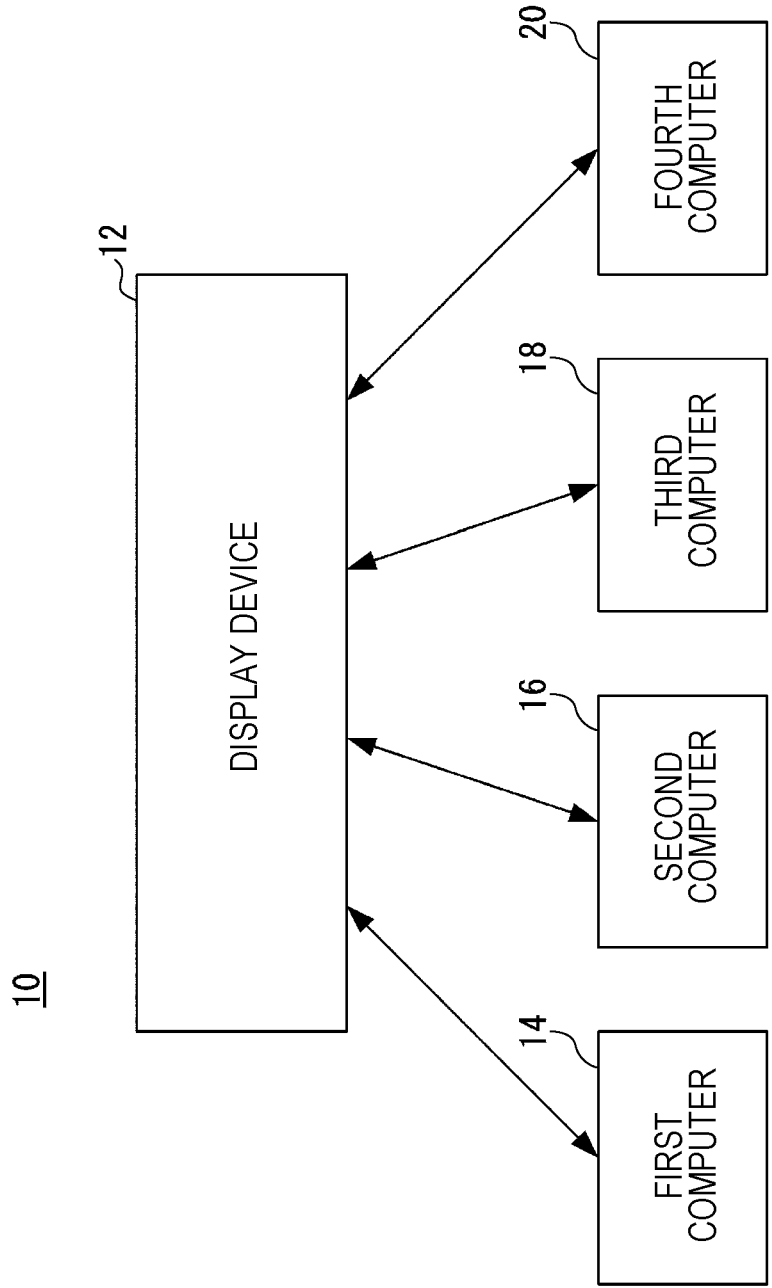
FIG. 1 is a diagram illustrating an example of a configuration of an information processing system according to the present disclosure.

FIG. 1 is a diagram illustrating an example of a configuration of an information processing system 10 according to the present disclosure. Referring to FIG. 1, the information processing system 10 according to a first example of the present disclosure includes a display device 12, four computers (a first computer 14, a second computer 16, a third computer 18, and a fourth computer 20).

In the first example, the case where the display device 12 is applied to an electronic blackboard will be described. The electronic blackboard is also called an interactive whiteboard (IWB). However, the display device 12 may be applied to other information devices or electronic devices as long as the devices may receive a touch input.

Each of the computers 14 to 20 is a general-purpose computer (information terminal) that outputs image data to the display device 12. In addition, each of the computers 14 to 20 includes components such as a CPU, a RAM, a HDD (storage unit), and a communication module.

Figure 2:
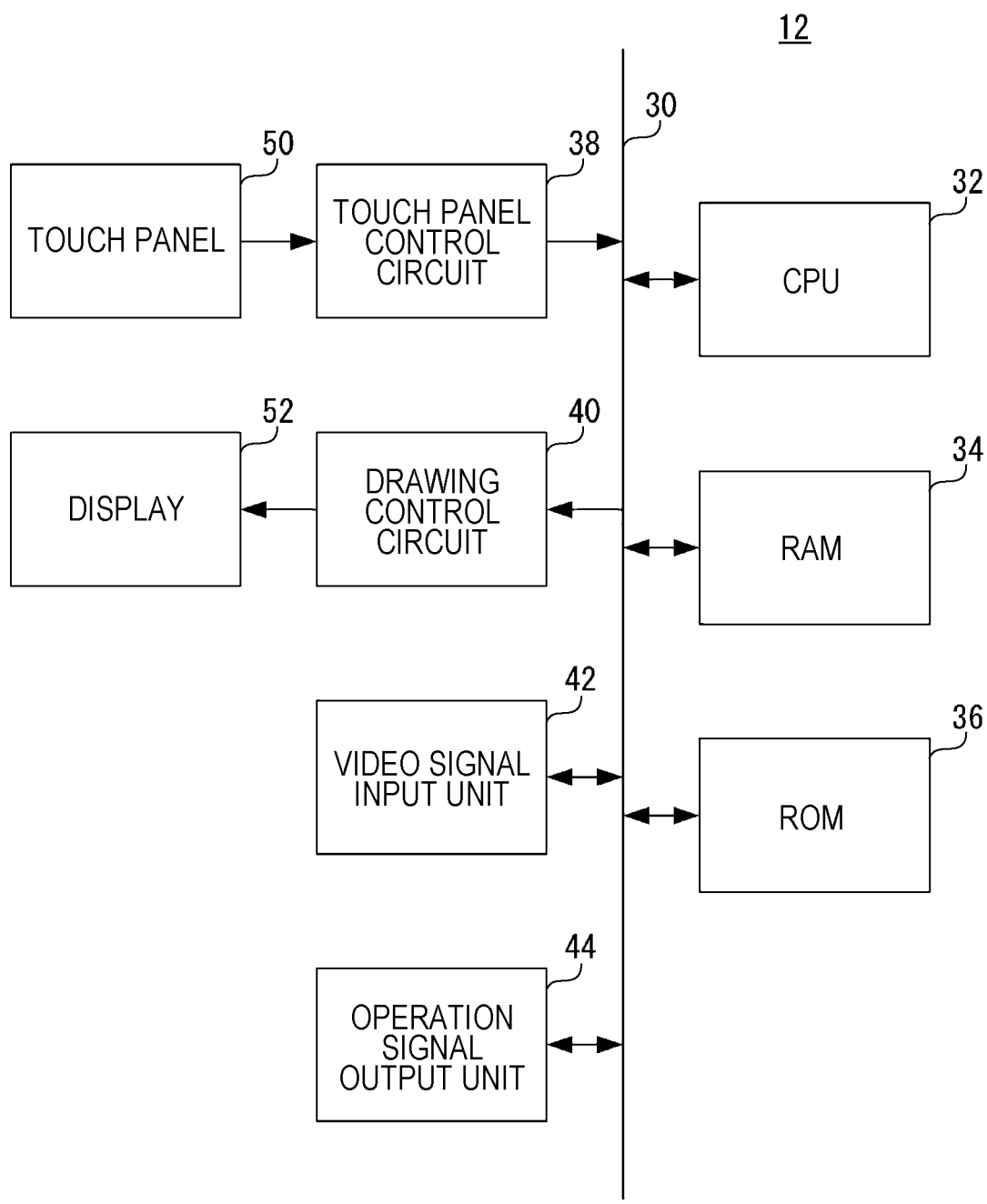
FIG. 2 is a block diagram illustrating an electrical configuration of a display device illustrated in FIG. 1.

FIG. 2 is a block diagram illustrating an electrical configuration of the display device 12 illustrated in FIG. 1. Referring to FIG. 2, the display device 12 according to the first example of the present disclosure includes a CPU 32. A RAM 34, a ROM 36, a touch panel control circuit 38, a drawing control circuit 40, a video signal input unit 42, and an operation signal output unit 44 are connected to the CPU 32 via a bus 30. In addition, a touch panel 50 is connected to the touch panel control circuit 38, and a display 52 is connected to the drawing control circuit 40.

The CPU 32 governs overall control of the display device 12. The RAM 34 is used as a work area and a buffer area of the CPU 32. The ROM 36 stores control programs for controlling the display device 12 and data on various pieces of setting information of the display device 12. However, another nonvolatile memory such as a flash memory or HDD may be provided instead of the ROM 36.

The touch panel control circuit 38 applies a necessary voltage and the like to the touch panel 50, detects a touch operation (touch input) within the touch effective range of the touch panel 50, and transmits touch coordinate data indicating the position of the touch input to the CPU 32.

The touch panel 50 is a general-purpose touch panel, and a desired method such as an electrostatic capacity method, an electromagnetic induction method, a resistive film method, an infrared method, or the like may be used. In the first example, as the touch panel 50, a touch panel of the electrostatic capacity method is provided on the display surface of the display 52.

Examples of the operation (input) using the touch panel 50 include a tap (short press), a slide (drag), a flick, a long touch (long press), and the like, and in the first example, these operations may be collectively referred to as a "touch input" or simply an "input". In addition, changing from a non-touching state of the touch panel 50 to a touching state is referred to as touch-on, and changing a touching state of the touch panel 50 to a touching state is referred to as touch-off. For consecutive touch inputs, that is, inputs by a slide or a flick, the touch panel 50 outputs touch coordinate data corresponding to the current touch position in a cycle shorter than a predetermined cycle. For example, the predetermined period is one to several frames, and one frame is 1/30 second, 1/60 second, or 1/120 second.

In the first example, the case where the touch panel 50 is used as an example of an input unit will be described, but as the input unit other than the touch panel 50, for example, another pointing device such as a touch pad may be used. In addition, the display device 12 may be provided with an operation panel including a hardware key as another input unit, a hardware keyboard may be connected, and a remote-control reception unit that receives a remote-control signal (infrared signal) transmitted from a remote controller (not shown) may be connected.

Returning to FIG. 2, the drawing control circuit 40 includes a GPU, a VRAM, and the like, and under the instruction of the CPU 32, the GPU generates screen data for displaying various display screens on the display 52 in the VRAM by using the image generation data 304b (see FIG. 7) stored in the RAM 34 and displays a screen corresponding to the generated screen data on the display 52. As the display 52, for example, an LCD or an EL display or the like may be used.

For example, the GPU generates screen data in the VRAM by using videos or images input from each of the computers 14 to 20 and displays various screens according to the generated screen data on the display 52.

The video signal input unit 42 is an interface for receiving video signals (image data) corresponding to videos or images input from each of the computers 14 to 20, and DisplayPort, HDMI (registered trademark), DVI, and D-SUB are used. However, it is also possible to input not only image data but also data about sound. In addition, the video signal input unit 42 includes multiple video signal input ports (hereinafter, sometimes simply referred to as "input ports") 420 (see FIG. 3). In the first example, the video signal input unit 42 includes four input ports 420. The four input ports 420 are provided in a predetermined arrangement on the back surface or the lower surface of the display device 12. Each of the computers 14 to 20 is connected to one of the four input ports 420 via an input cable corresponding to the interface adopted by the video signal input unit 42.

The operation signal output unit 44 is an interface for outputting operation signals to each of the computers 14 to 20, and USB or the like is used. In addition, the operation signal output unit 44 includes multiple operation signal output ports (hereinafter, sometimes simply referred to as "output ports") 440. In the first example, the operation signal output unit 44 includes four output ports 440. The four output ports 440 are provided in a predetermined arrangement on the back surface or the lower surface of the display device 12. Each of the computers 14 to 20 is connected to one of the four output ports 440 via an output cable corresponding to the interface adopted by the operation signal output unit 44.

In the information processing system 10 having such a configuration, since there are multiple input ports 420 and multiple output ports 440, the association (combination) between the input port 420 and the output port 440 becomes complicated, and there is a possibility that the combination of the input cable and the output cable connected to the computer is incorrectly connected. In this case, the user needs to check whether the combination of the input port 420 and the output port 440 connected to the same computer is correct, which is troublesome.

In addition, in order to select a correct combination of the input ports 420 and the output ports 440, it is also considered a method in which a switching unit is provided and the electrical connection between each of the input ports 420 and each of the output ports 440 is switched in response to the operation of the user, but the user may not be able to select a correct combination at all times. Therefore, in a case where the user is not able to select a correct combination, the user needs to switch the connection until the input port 420 and the output port 440 are correctly combined and to check the input port 420 and the output port 440 connected to the same computer, which is troublesome.

Therefore, in the first example, detection signals for changing the image are output (transmitted) to each of the output ports 440, a change in the image is detected, and a combination of the output port 440 which has transmitted the detection signal and the input port 420 corresponding to the changed image is automatically set.

Figure 3:
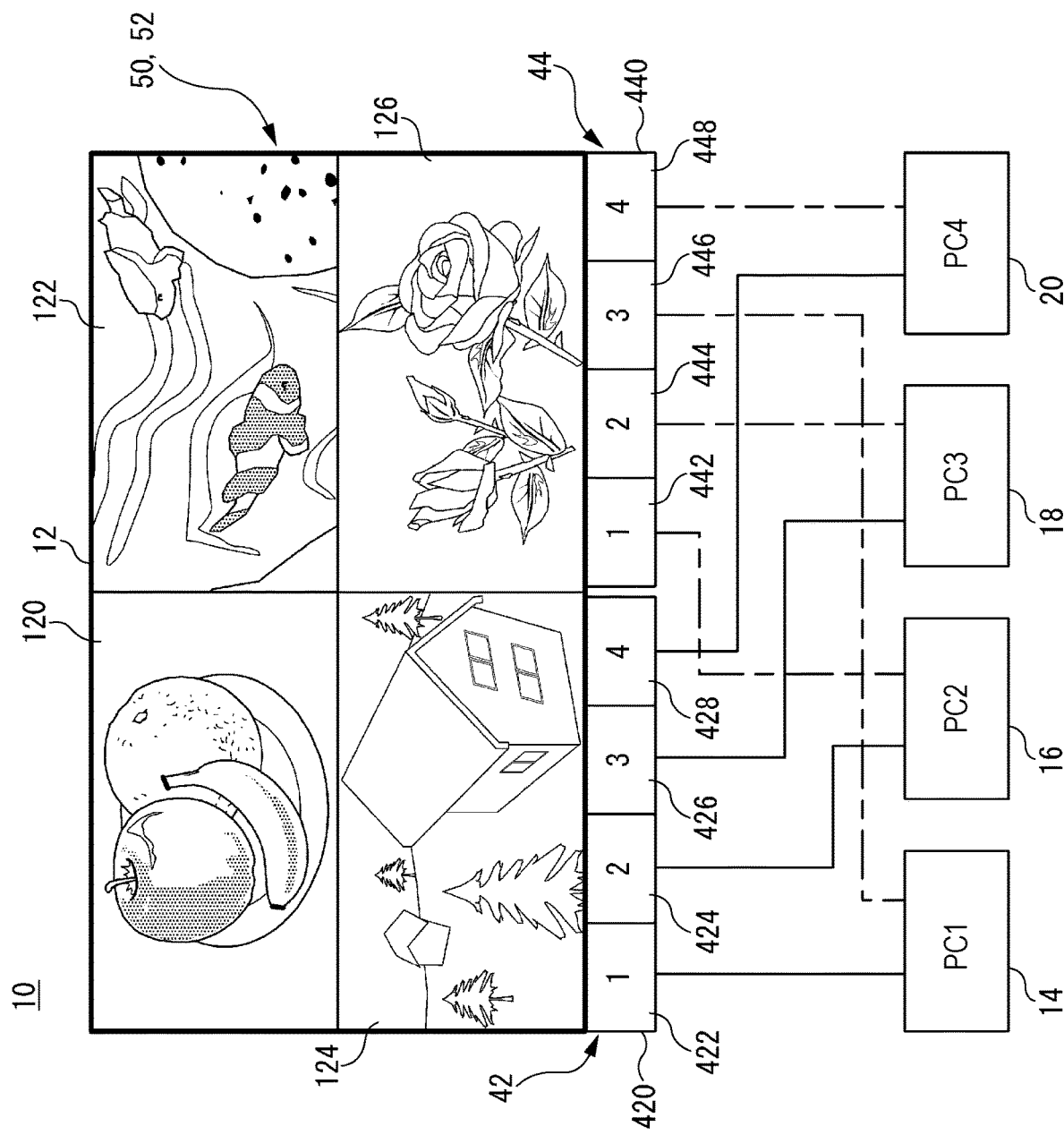
FIG. 3 is a diagram illustrating an example of a connection state between a display screen of the display device and the information processing system illustrated in FIG. 1.

FIG. 3 is a diagram illustrating an example of a connection state between the display device 12 and the computers 14 to 20 illustrated in FIG. 1. FIG. 4 is a diagram illustrating an example of an operation example of the information processing system 10. FIG. 5 is an illustrative diagram illustrating an example of a provisional connection setting table. FIG. 6 is an illustrative diagram illustrating an example of the connection setting table after automatic setting.

As illustrated in FIG. 3, the display device 12 and each of the computers 14 to 20 are connected by an input cable and an output cable as described above. However, the video signal input unit 42 includes four input ports 420 (a first input port 422 to a fourth input port 428), and the operation signal output unit 44 includes four output ports 440 (a first output port 442 to a fourth output port 443).

Specifically, the input cable of the first computer 14 is connected to the first input port 422 of the video signal input unit 42, the output cable of the first computer 14 is connected to the third output port 446 of the operation signal output unit 44.

The input cable of the second computer 16 is connected to the second input port 424 of the video signal input unit 42, and the output cable of the second computer 16 is connected to the first output port 442 of the operation signal output unit 44.

The input cable of the third computer 18 is connected to the third input port 426 of the video signal input unit 42, and the output cable of the third computer 18 is connected to the second output port 444 of the operation signal output unit 44.

The input cable of the fourth computer 20 is connected to the fourth input port 428 of the video signal input unit 42, and the output cable of the fourth computer 20 is connected to the fourth output port 448 of the operation signal output unit 44.

In addition, the display device 12 of the first example has a so-called picture-by-picture (PbyP) function. In the example illustrated in FIG. 3, the display area of the display 52 is divided into two in the top and bottom, divided into two in the left and right, which is divided into four areas. Therefore, the display screen displayed on the display 52 includes four sub-screens (a first sub-screen 120 to a fourth sub-screen 126) displayed in the four areas. The first sub-screen 120 is displayed in the upper-left area of the display 52, the second sub-screen 122 is displayed in the upper-right area of the display 52, the third sub-screen 124 is displayed in the lower-left area of the display 52, and the fourth sub-screen 126 is displayed in the lower-right area of the display 52.

However, one of the four input ports 420 (the first input port 422 to the fourth input port 428) and one of the four output ports 440 (the first output port 442 to the fourth output Port 448) are allocated respectively on each of the sub-screens 120 to 126. Therefore, images corresponding to the videos or images input to the corresponding input ports 420 are displayed on each of the sub-screens 120 to 126. In addition, in a case where there is a touch input within the display areas of the sub-screens 120 to 126, the touch coordinate data corresponding to the touch position is output from the output port 440 corresponding to the sub-screen on which the touch input is made.

In addition, the combination of the sub-screens 120 to 126 and each of the four input ports 420 is predetermined. The first sub-screen 120 corresponds to the first input port 422, the second sub-screen 122 corresponds to the second input port 424, the third sub-screen 124 corresponds to the third input port 426, the fourth sub-screen 126 corresponds to the fourth input port 428. In this first example, the combination of the sub-screens 120 to 126 and each of the four input ports 420 is fixed and is not changed.

Therefore, an image input from the first computer 14 via the first input port 422 is displayed on the first sub-screen 120, an image input from the second computer 16 via the second input port 424 is displayed on the second sub-screen 122, an image input from the third computer 18 via the third input port is displayed on the third sub-screen 124, and an image input from the fourth computer 20 via the fourth input port 428 is displayed on the fourth sub-screen 126.

The combination of each of the sub-screens 120 to 126 and each of the four input ports 420 as described above is described in the connection setting table illustrated in FIG. 5. However, the connection setting table illustrated in FIG. 5 is a provisional table in the initial state. The initial state means a state before connection processing to be described later is executed.

In addition, in the connection setting table, in addition to the combination of each of the sub-screens 120 to 126 and each of the four input ports 420, the combination of each of the sub-screens 120 to 126 (four input ports 420) and each of the four output ports 440 is described. However, the combination of each of the sub-screens 120 to 126 and each of the four output ports 440 in the initial state is predetermined.

For example, as illustrated in FIG. 5, in the connection setting table in the initial state, the first output port 442 is associated with the first sub-screen 120, the second output port 444 is associated with the second sub-screen 122, the third output port 446 is associated with the third sub-screen 124, and the fourth output port 448 is associated with a fourth screen 12S.

As seen from FIGS. 3 and 5, in the initial state, a video input corresponds to the first computer 14, and an operation output corresponds to the second computer 16 in the first sub-screen 120. In the second sub-screen 122, a video input corresponds to the second computer 16, and an operation output corresponds to the third computer 18. In the third sub-screen 124, a video input corresponds to the third computer 18, and an operation output corresponds to the first computer 14. In the fourth sub-screen 126, both the video input and the operation output correspond to the fourth computer 20.

As described above, in the initial state, in the first to third sub-screens 120 to 124 excluding the fourth sub-screen 126, a video input and an operation output are associated with different computers. That is, in the initial state, there is an error in the combination of the input ports 420 and the output ports 440.

Here, in a case where the display device 12 receives a predetermined user operation (start operation), the display device 12 performs processing (connection processing) of automatically setting a combination of each of the four input ports 420 (sub-screens 120 to 126) and each of the four output ports 4-10. However, the start operation is an operation in which an icon for a start operation is touched or an operation in which a hardware key for a start operation is pressed. In order to receive the start operation, it is considered that an operation screen including an icon for the start operation for executing the connection processing is displayed on the display 52 or a hardware key for starting an operation for executing the connection processing is provided on the display device 12 or the remote controller.

However, at least during the execution of the connection processing, still images are displayed on the sub-screens 120 to 126. Here, images for the connection processing are stored in advance in each of the computers 14 to 20, and images for the connection processing may be displayed on the sub-screens 120 to 126, or standby screens composed of still images may be displayed on the sub-screens 120 to 126.

In addition, as illustrated in FIG. A, an index image 130 such as a mouse pointer is displayed on the sub-screens 120 to 126 at least during the execution of the connection processing. The index image 130 moves in accordance with the touch coordinate data output from the display device 12. In addition, the index image may be hidden in a case where the touch coordinate data is not input for a predetermined time or more. However, when the touch coordinate data is input in a state of being hidden, the index image 130 is displayed at a position corresponding to the position indicated by the touch coordinate data or at a position when the touch coordinate data is hidden.

Next, the contents of the connection processing will be described. To briefly describe, when the connection processing is started, the display device 12 automatically sets a combination of each of the four input ports 420 (the sub-screens 120 to 126) and the four output ports 440 so that a video input and an operation output are associated with the same computer by using dummy operation signals (hereinafter, referred to as "detection signal") for changing the sub-screens 120 to 126. Hereinafter, the connection processing will be specifically described.

When the connection processing is started, the display device 12 sequentially outputs detection signals from each of the four output ports 440. The detection signal is a signal corresponding to the touch coordinate data corresponding to a dummy touch input (for example, a slide or a flick) whose touch position moves within the display area of the display 52. The display device 12 sequentially outputs detection signals from the first output port 442 to the fourth output port 448.

Here, when detection signals are input to each of the computers 14 to 20 via each of the four output ports 440, the index image 130 is moved or the hidden index image 130 is displayed according to the dummy touch input corresponding to the detection signal on the sub-screen corresponding to the computer to which the detection signals are input. That is, the image included in the display screen displayed on the display 52 changes.

When the detection signal is output from the certain output port 440, the display device 12 detects a change in the image corresponding to the detection signal. Here, the display device 12 compares the images (video) between the frames before and after the display screen displayed on the display 52 and detects whether the image has changed or not. In addition, when a change in the image is detected, the changed position of the image is detected. When the changed position of the image is detected, it is determined in which of the display areas of the sub-screens 120 to 126 the position is included. That is, among the sub-screens 120 to 126, the sub-screen in which the image has changed is detected.

A combination of the output port 440 that has output a detection signal and the input port 420 corresponding to the sub-screen in which the image has changed when the detection signal is output is automatically set.

For example, when the connection processing is started, a detection signal is first output to the first output port 442. As seen from FIG. 3, since the second computer 16 is connected to the first output port 442 via the output cable, the detection signal output from the first output port 442 is input to the second computer 16. Therefore, the image input from the second computer 16 changes. Here, since the input cable of the second computer 16 is connected to the second input port 424, as illustrated in FIG. 4, the index image 130 moves, and the image included in the second sub-screen 122 corresponding to the second input port 424 changes. Therefore, a combination of the first output port 442 that has output the detection signal and the second input port 424 corresponding to the second sub-screen 122 and the second sub-screen 122 in which the image has changed is set.

When the combination of the first output port 442 is set, a detection signal is output from the second output port 444. As seen from FIG. 3, the detection signal output from the second output port 444 is input to the third computer 18. Since the third computer 18 is connected to the third input port 426, the image included in the third sub-screen 124 corresponding to the third input port 426 changes. Therefore, a combination of the second output port 444 and the third input port 426 (the third sub-screen 124) is set.

When the combination of the second output port 444 is set, a detection signal is output from the third output port 446. The detection signal output from the third output port 446 is input to the first computer 14. Since the first computer 14 is connected to the first input port 422, the image contained in the first sub-screen 120 corresponding to the first input port 422 changes. Therefore, a combination of the third output port 446 and the first input port 422 (the first sub-screen 120) is set.

Finally, a detection signal is output from the fourth output port 448, the same processing as above is performed, and a combination of the fourth output port 448 and the fourth input port 428 (the fourth sub-screen 126) is set. However, when a detection signal is output from the fourth output port 448, since only one input port 420 and one output port 440 (the fourth input port 428 and the fourth output port 448)

remain, a combination of the remaining input ports 420 and the remaining output ports 440 is set, and the above processing may be omitted.

In accordance with the combination of each of the four input ports 420 and the four output ports 440 set as described above, the connection setting table is updated as illustrated in FIG. 6.

Thereafter, the operation input data is distributed and output to each output port 440 according to the connection setting table updated by the connection processing. For example, in a case where a touch input is made in the display area of the first sub-screen 120, the touch coordinate data corresponding to the touch input is output to the third output port 446 and input to the first computer 14. As described above, after the connection processing is executed, the information processing system 10 may be used in a state where the combination of the input port 420 and the output port 440 is correct.

The above-described operation of the information processing system 10 is realized by the CPU 32 of the display device 12 executing an information processing program stored in the RAM 34. Specific processing will be described later with reference to a flowchart.

Figure 7:
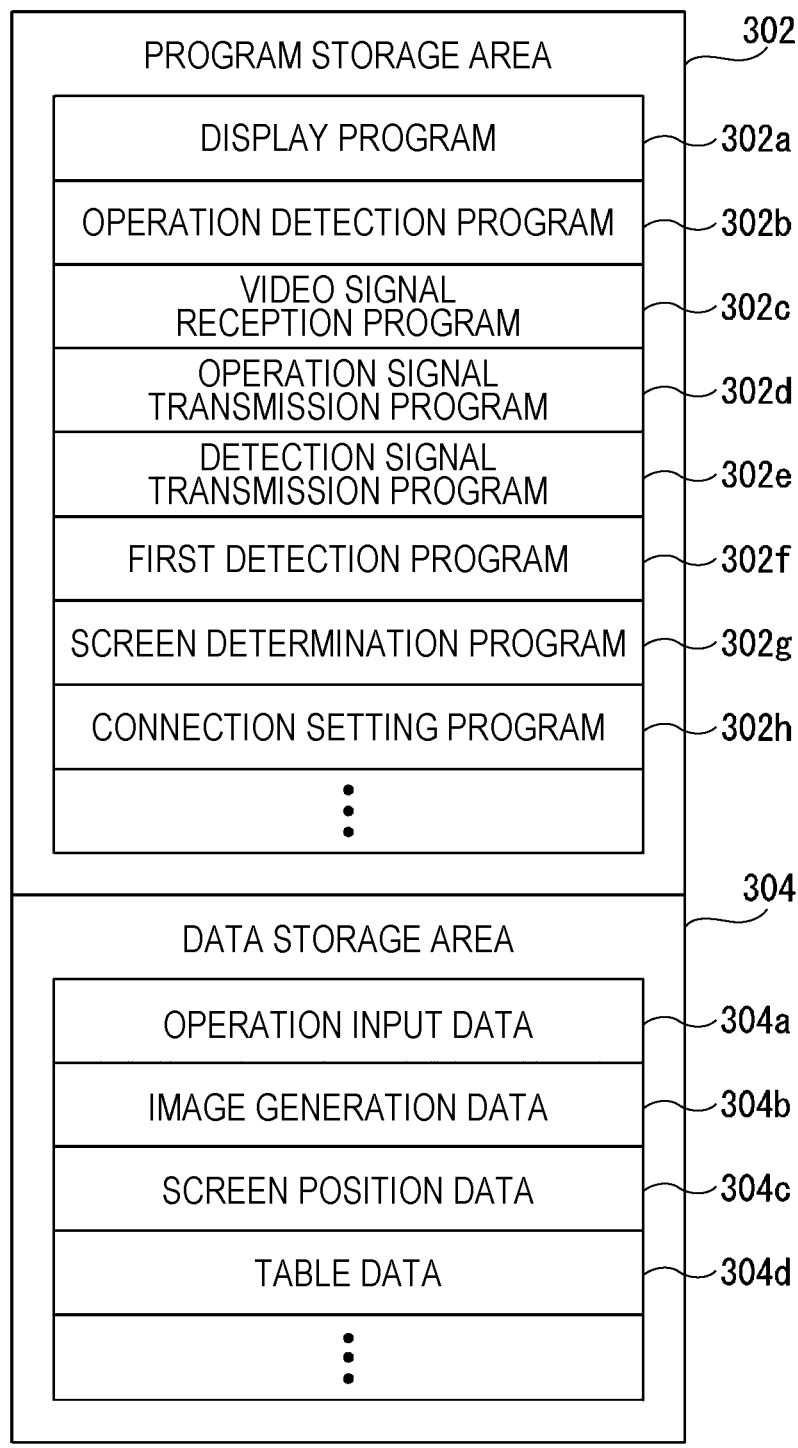
FIG. 7 is an illustrative diagram illustrating an example of a memory map of a RAM illustrated in FIG. 2.

FIG. 7 illustrates an example of a memory map of the RAM 34 of the display device 12 illustrated in FIG. 2. As illustrated in FIG. 1, the RAM 34 includes a program storage area 302 and a data storage area 304. In the program storage area 302, as described above, the information processing program is stored. The information processing program includes a display program 302a, an operation detection program 302b, a video signal reception program 302c, an operation signal transmission program 302d, a detection signal transmission program 302e, a first detection program 302f, a screen determination program 302g, and a connection setting program 302h.

The display program 302a is a program for displaying various screens such as the sub-screens 120 to 126 on the display 22 by using image generation data 304b to be described later. In addition, the display program 302a is a program for outputting screen data to the display 52 so that each of the sub-screens 120 to 126 is displayed in a predetermined display area according to screen position data 304c to be described later.

The operation detection program 302b is a program for detecting a touch input, and the CPU 32 acquires touch coordinate data output from the touch panel 50 and stores the acquired touch coordinate data in the RAM 34 in time series in accordance with this operation detection program 302b. However, as described above, in a case where a hardware key or a keyboard is provided, an input of an operation button is also detected in accordance with the operation detection program 302b. In addition, an input of a key of a remote controller is also detected according to the remote-control signal transmitted from the remote controller in accordance with the operation detection program 302b.

The video signal reception program 302c is a program for performing predetermined processing on the video signals input from the computers 14 to 20 to the first input port 422 to the fourth input port 428 based on the image size, image quality, and specification of signal conversion to generate screen data corresponding to each of the sub-screens 120 to 126.

The operation signal transmission program 302d is a program for distributing (transmitting) and outputting the touch coordinate data acquired in accordance with the operation detection program 302b to one of the four output ports 440 according to the result determined in accordance with the screen determination program 302g. Specifically, the touch coordinate data is output to the output port 440 corresponding to the sub-screen corresponding to the touch coordinate data according to the connection setting table.

The detection signal transmission program 302e is a program for sequentially outputting detection signals from each of the four output ports 440.

When the detection signal is output from any one of the four output ports 440, the first detection program 302f detects a change in the image of the display screen displayed on the display 52. In addition, the first detection program 302f is also a program for detecting the sub-screen in which the image has changed in the sub-screens 120 to 126 according to the changed position of the image.

The screen determination program 302g is a program for determining in which of the display areas of the sub-screens 120 to 126 the coordinates of the touch coordinate data detected by the operation detection program 302b are included. Specifically, the CPU 32 executing the screen determination program 302g refers to the screen position data 304c to be described later and determines in which of the four sets of coordinate data corresponding to the display area of each of the sub-screens 120 to 126 the coordinates of the touch coordinate data are included.

The connection setting program 302h is a program for setting a combination of the output port 440 that has output a detection signal and the input port 420 corresponding to the sub-screen in which the image has changed when the detection signal is output and updating the connection setting table.

Although not illustrated in the drawing, a program for selecting and executing various functions and actions, another application program, and the like are also stored in the program storage area 302.

In the data storage area 304, operation input data 304a, image generation data 304b, screen position data 304c, table data 304d, and the like are stored.

The operation input data 304a is data obtained by storing the touch coordinate data detected in accordance with the operation detection program 302b in time series. However, the operation input data 304a may include operation data regarding operations of buttons of hardware or operations of the remote controller.

The image generation data 304b is data such as polygon data or texture data for generating display image data corresponding to various screens including the sub-screens 120 to 126 displayed on the display 52 and other operation screens.

The screen position data 304c is a set of coordinate data indicating the display area (display position) of each of the sub-screens 120 to 126. However, the screen position data 304c includes position data for each sub-screen.

The table data 304d is data such as the connection setting table described above. However, this table data 304d is stored, for example, in the main storage unit of the display device 12. The table data 304d is read out from the main storage unit of the display device 12 and stored in the RAM 34 as necessary.

Although not shown, other data necessary for the execution of the information processing program is stored in the data storage area 304, and a timer (counter) and a register necessary for executing the information processing program are provided.

Figure 8:
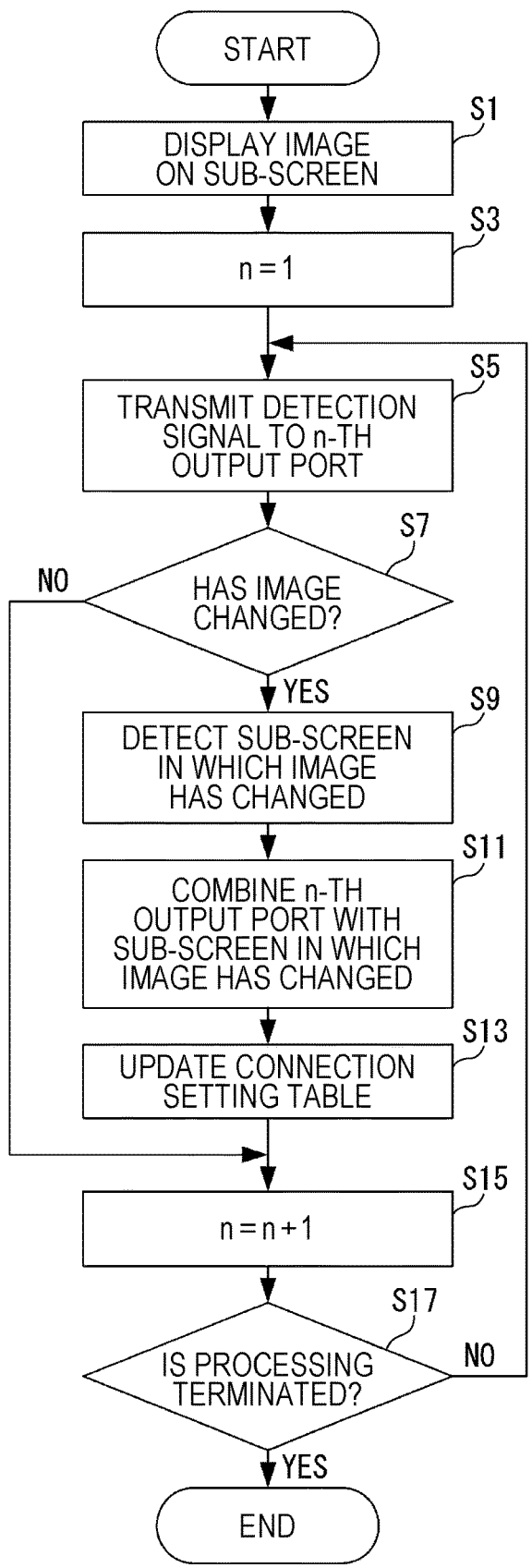
FIG. 8 is a flowchart illustrating an example of connection processing of a CPU illustrated in FIG. 2.

FIG. 8 is a flowchart illustrating an example of the connection processing of the CPU 32 of the display device 12 illustrated in FIG. 2. When the start operation is received, as illustrated in FIG. 8, the CPU 32 starts the connection processing, displays an image (still image) input from the computers 14 to 20 on each of the sub-screens 120 to 126 in step S1, and sets an initial value to the variable n (n=1) in step S3. This variable n is set to individually identify the output ports 440. Specifically, the variable n is provided to individually identify the first output port 442 to the fourth output port 448 of the operation signal output unit 44.

Subsequently, in step S5, a detection signal is output to the n-th output port, and it is determined whether or not the image has changed in step S7. If "NO" in step S7, that is, in a case where it is determined that the image has not changed, the processing proceeds to step S15 to be described later. On the other hand, if "YES" in step S7, that is, in a case where it is determined that the image has changed, the sub-screen in which the image has changed is detected in step S9, the sub-screen in which the image has changed in step S11, and the input port 420 corresponding to the sub-screen are combined with the n-th output port that has output the detection signal in step S5.

Subsequently, in step S13, the connection setting table is updated with the contents of step S11, the variable n is incremented by 1 (n=n+1) in step S15, and it is determined whether or not the processing is terminated in step S17. Here, it is determined whether or not the variable n exceeds the maximum number (the number of output ports 440, 4 in this example).

If "NO" in step S17, that is, in a case where it is determined that the processing is terminated, the processing returns to step S5. On the other hand, if "YES" in step S17, that is, in a case where it is determined that the processing is terminated, the connection processing is terminated.

In the first example, when a predetermined start operation is received, in the first example, detection signals for changing the image are output (transmitted) to each of the output ports 440, a change in the image is detected, and a combination of the output port 440 which has transmitted the detection signal and the input port 420 corresponding to the changed image is automatically set. Therefore, since the user only has to perform the start operation, it is possible to combine the video input and the operation output with a simple operation.

In the information processing system 10 of the first example, input cables are connected to all the input ports 420, output cables are connected to all the output ports 440, and the number of computers corresponding to the number of the input ports 420 and the output ports 440 are included, but is not limited thereto. For example, in a case where the four input ports 420 and the four output ports 440 are provided, the present disclosure may be applied even in a case where two or three computers are connected to the display device 12. That is, the present disclosure may be applied even in a case where there is the input port 420 to which the input cable is not connected or when there is the output port 440 to which the output cable is not connected. In this case, even if a detection signal is output to the output port 440 to which the output cable (computer) is not connected, the image of the display screen displayed on the display 52 does not change. Therefore, no combination may be set for the output port 440 to which the output cable is not connected, or a combination with the remaining input ports 420 may be set according to the combination of the other output ports 440.

In addition, in the information processing system 10 of the first example, when the connection processing is executed, the combination of the sub-screens 120 to 126 and the output port 440 with respect to the input port 420 is changed but is not limited thereto. A combination of the sub-screens 120 to 126 and the output port 440 may be predetermined, and the combination of the sub-screens 120 to 126 and the input port 420 with respect to the output port 440 may be changed.

Second Example

Since the information processing system 10 of the second example is the same as the first example except that a screen corresponding to one input port among the first input port 422 to the fourth input port 428 is displayed in the entire display area of the display 52 (full-screen display), contents different from those of the first example will be described, and redundant description will be omitted.

Figure 9:
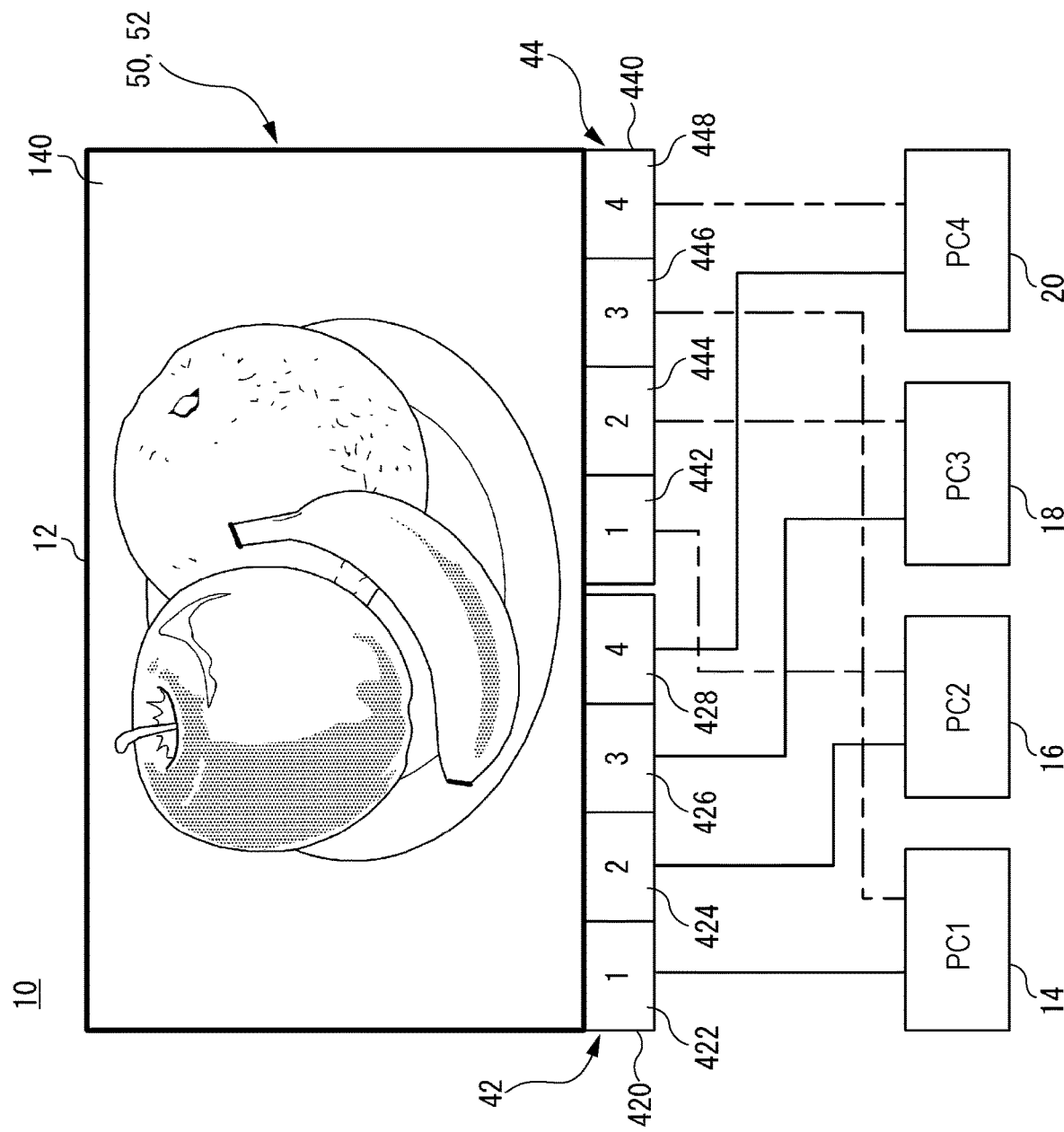
FIG. 9 is a diagram illustrating an example of a connection state between a display screen of a display device and an information processing system in a second example.

FIG. 9 is a diagram illustrating an example of a connection state between a display screen 140 of the display device 12 and the information processing system 10 in a second example. As illustrated in FIG. 9, in the display device 12 of the second example, one display screen 140 is displayed in the entire display area of the display 52. At this time, the display screen 140 corresponds to one of the four input ports 420 (the first input port 422 to the fourth input port 426). However, which of the four input ports 420 the display screen 140 corresponds to depends on the operation of the user. In the example illustrated in FIG. 9, it is assumed that the display screen 140 corresponds to the first input port 422 (the first computer 14) and includes the image input to the first input port 422.

However, in the initial state, a combination with the first output port 442 is set in the first input port 422. However, as seen from FIG. 9, the second computer 16 is connected to the first output port 442. Therefore, in the initial state, a video input and an operation output are associated with different computers on the display screen 140.

When receiving the start operation, the display device 12 starts the connection processing. However, as in the first example, at least during the execution of the connection processing, a still image is displayed on the display screen 140, and an index image such as a mouse pointer is displayed.

In addition, when the connection processing is started, the display device 12 sequentially outputs a detection signal from each of the four output ports 440. However, when the display device 12 of the second example outputs the detection signal from the output port 440, the display device 12 detects only whether or not the image has changed and does not detect the changed position of the image. In the second example, since the display screen 140 is displayed in the entire display area of the display 52, unlike the first example in which multiple screens are displayed, there is no need to detect a screen in which the image has changed.

A combination of the input port 420 (in this case, the first input port 422) corresponding to the display screen 140 and the output port 440 that has output the detection signal when the image changes is automatically set.

An example of the operation of the connection processing of the second example will be described. First, when the connection processing is started, a detection signal is output from the first output port 442. Since the second computer 16 is connected to the first output port 442 via the output cable, the detection signal output from the first output port 442 is input to the second computer 16. However, since the second computer 16 is connected to the second input port 424, the image of the display screen 140 corresponding to the first input port 422 does not change. When a predetermined time (for example, several seconds) elapses in a state where the image does not change, a detection signal is output from the second output port 444. The detection signal output from the second output port 444 is input to the third computer 18. However, since the third computer 18 is connected to the third input port 426, the image of the display screen 140 corresponding to the first input port 422 does not change.

Next, a detection signal is output from the third output port 446. Since the first computer 14 is connected to the third output port 446 via the output cable, the detection signal output from the third output port 446 is input to the first computer 14. Since the first computer 14 is connected to the first input port 122, when a detection signal is input to the first computer 14, the image on the display screen 140 changes.

Therefore, a combination of the first input port 422 corresponding to the display screen 140 and the third output port 446 that has output the detection signal when the image is changed is set.

Figure 10:
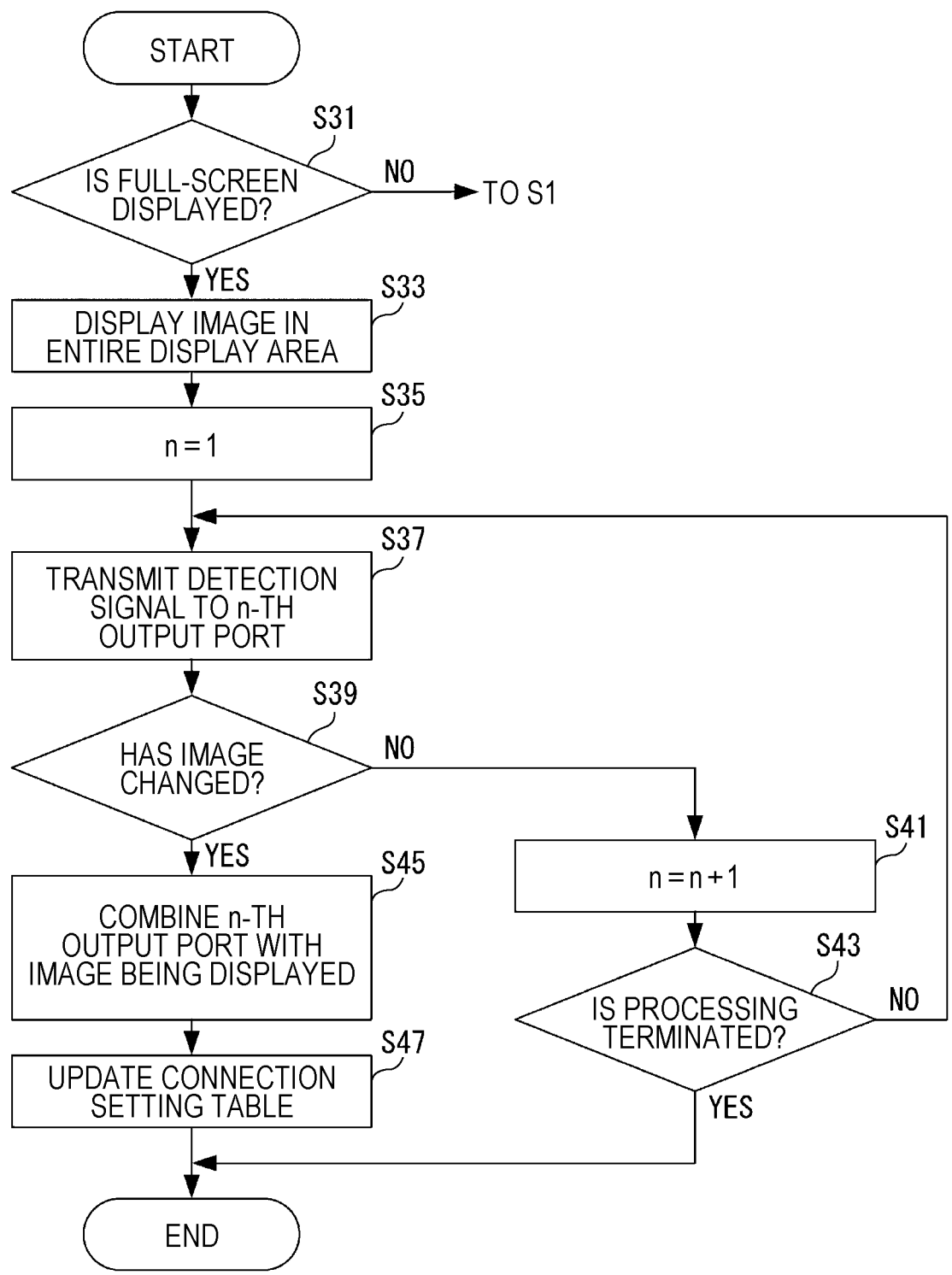
FIG. 10 is a flowchart illustrating an example of connection processing in the second example.

FIG. 10 is a flowchart illustrating an example of the connection processing in the second example. The connection processing in the second example will be described below with reference to a flowchart, but the same reference numerals are given to the same processing as the connection processing described in the first example, and duplicated contents will be omitted or briefly described.

As illustrated in FIG. 10, when the connection processing is started, the CPU 32 determines whether or not the full-screen is displayed in step S31. If "NO" in step S31, that is, in a case where the full-screen is not displayed (the sub-screen is displayed), the processing proceeds to step S1. The contents of the processing in the case of proceeding to step S1 are the same as those in the first example, and the description thereof will be omitted.

On the other hand, if "YES" in step S31, that is, in a case where the full-screen is displayed, an image (still image) input from any one of the computers 14 to 20 is displayed in the entire display area of the display 52 in step S33, and an initial value is set to the variable n in step S35, a detection signal is output to the n-th output port in step S37, and it is determined whether or not the image has changed in step S39. If "NO" in step S39, that is, in a case where it is determined that the image has not changed, the variable n is incremented by 1 in step S41, and it is determined whether or not the processing is terminated in step S43. If "NO" in step S43, that is, in a case where it is determined that the processing is terminated, the processing returns to step S37. On the other hand, if "YES" in step S43, that is, in a case where it is determined that the processing is terminated, the connection processing is terminated. For example, in a case where an output cable is not connected to the computer corresponding to the display screen 140 (in a case where an operation signal is not output), the combination of the input port 420 and the output port 440 may not be set and the connection processing may be terminated.

On the other hand, if "YES" in step S39, that is, in a case where it is determined that the image has changed, in step S45, the input port 420 corresponding to the image being displayed is combined with the n-th output port that has output the detection signal in the last step S37, and the connection setting table is updated with the contents of step S45, and the connection processing is terminated in step S47.

According to the second example, in a state where the full-screen is displayed, since detection signals for changing the image are output (transmitted) to each of the output ports 440, a change in the image being displayed is detected, and the combination of the input port 420 corresponding to the image being displayed and the output port 440 that has output the detection signal when the image has changed is set, it is possible to combine a video input and an operation output with a simple operation.

Third Example

Since the third example is the same as the first example except that the connection processing is executed when the connection state in the video signal input unit 42 or the operation signal output unit 44 changes, contents different from those of the first example will be described, and redundant description will be omitted.

In the information processing system 10 of the third example, the connection processing is executed not only when the start operation is received but also when a connection state in the video signal input unit 42 has changed. However, when the connection state in the video signal input unit 42 changes, it means that input cables are newly attached (connected) to the first input port 422 to the fourth input port 428, or that the attached input cables are detached.

In addition, in the information processing system 10 of the third example, the connection processing is executed when a connection state in the operation signal output unit 44 changes. However, when the connection state in the operation signal output unit 44 changes, it means that output cables are newly attached to the first output port 442 to the fourth output port 448, or that the attached input cables are detached.

That is, when the number of input cables connected to the video signal input unit 42 changes, or the number of output cables connected to the operation signal output unit 44 changes, it is determined that the connection state in the video signal input unit 42 or the operation signal output unit 44 has changed.

In addition, in the third example, in order to realize the above-described operation, the information processing program stored in the RAM 34 of the display device 12 includes a connection state detection program for detecting the connection state in the video signal input unit 42 or the operation signal output unit 44, a connection state determination program for determining whether or not the connection state in the video signal input unit 42 or the operation signal output unit 44 has changed according to the connection state detected in accordance with the connection state detection program, and the like.

Figure 11:
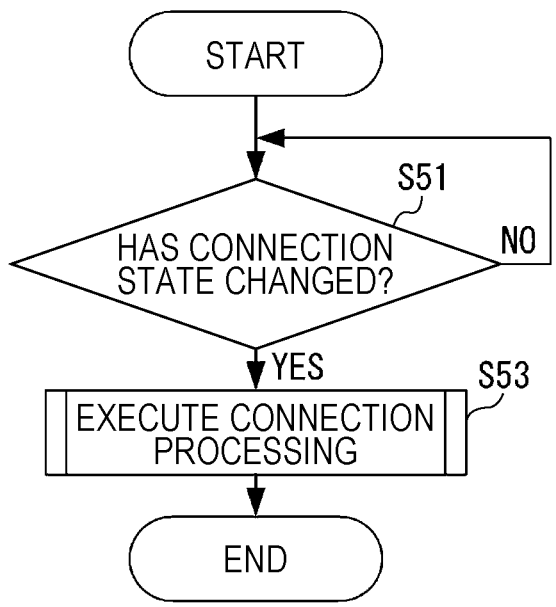
FIG. 11 is a flowchart illustrating an example of information processing in a third example.

FIG. 11 is a flowchart illustrating an example of information processing by the CPU 32 of the display device 12 in the third example. Information processing in the third example will be described below with reference to a flowchart. This information processing is started when the main power supply of the display device 12 is turned on.

As illustrated in FIG. 11, when information processing is started, the CPU 32 determines whether the connection state in the video signal input unit 42 or the operation signal output unit 44 has changed in step S51. If "NO" in step S51, that is, in a case where it is determined that the connection state in the video signal input unit 42 or the operation signal output unit 44 has not changed, the processing returns to the same step S51. On the other hand if "YES" in step S51, that is, in a case where it is determined that the connection state in the video signal input unit 42 or the operation signal output unit 44 has changed, the connection processing is executed to end the information processing in step S53. The contents of the connection processing in step S53 are the same as those in the first example, and the description thereof will be omitted.

According to the third example, since the connection processing is started when the connection state in the video signal input unit 42 or the operation signal output unit 44 has changed, it is possible to set the combination of the video signal input port and the operation signal output port at an appropriate timing.

The aspects described in the third example may also be adopted in combination with the second example.

Fourth Example

Since the fourth example is the same as the first example except that the connection processing is executed when the screen configuration displayed on the display 52 has changed, contents different from those of the first example will be described, and redundant description will be omitted.

In the information processing system 10 of the fourth example, the connection processing is executed when the screen configuration displayed on the display 52 has changed. However, when the screen configuration changes, it means that the number of screens displayed on the display 52 changes. Specifically, when a state where one screen is displayed in the entire display area of the display 52 (the state where the full-screen is displayed) changes to a state where the display area of the display 52 is divided and multiple sub-screens are displayed, a state where the sub-screens are displayed on the display 52 to a state where the full-screen is displayed, or the number of sub-screens changes in a state where the sub-screens are displayed on the display 52, it is determined that the screen configuration has changed. In addition, it is determined that the screen configuration has changed even when the input port corresponding to the display screen is switched in a state where the full-screen is displayed.

In the fourth example, in order to realize the above-described operation, the information processing program stored in the RAM 34 of the display device 12 includes a screen number detection program for detecting the number of screens displayed on the display 52, a screen configuration determination program for determining whether or not the number of screens displayed on the display 52 has changed according to the number of screens detected in accordance with the screen number detection program, and the like.

Figure 12:
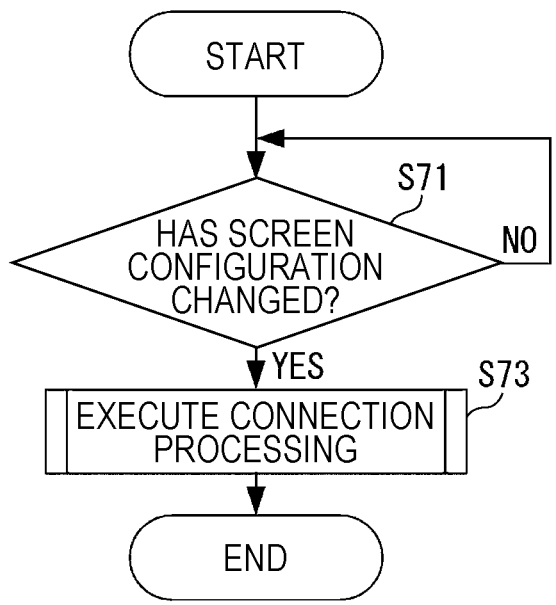
FIG. 12 is a flowchart illustrating an example of information processing in a fourth example.

FIG. 12 is a flowchart illustrating an example of information processing by the CPU 32 of the display device 12 in the fourth example. Information processing in the fourth example will be described below with reference to a flowchart. This information processing is started when the power supply of the display device 12 is turned on.

As illustrated in FIG. 12, when information processing is started, the CPU 32 determines whether the screen configuration displayed on the display 52 has changed in step S71. If "NO" in step S71, that is, in a case where it is determined that the screen configuration displayed on the display 52 has not changed, the processing returns to the same step S71. On the other hand, if "YES" in step S71, that is, in a case where it is determined that the screen configuration displayed on the display 52 has changed, the connection processing is executed in step S73 and the information processing is ended. The contents of the connection processing in step S73 are the same as those in the first example, and the description thereof will be omitted.

According to the fourth example, since the connection processing is executed when the screen configuration displayed on the display 52 changes, it is possible to set a combination of the video signal input port and the operation signal output port at an appropriate timing.

The aspects described in the fourth example may also be adopted in combination with the second example.

In addition, the present disclosure may also be applied to a multi-display including multiple display devices. For example, a multi-display includes multiple (for example, 4) display devices. Although not shown, in the multi-display, multiple display devices are arranged in a vertical direction or a horizontal direction. In addition, the display panels constituting the display unit of each of the display devices are arranged with no gap therebetween, and one large display panel is formed. Further, the display devices are connected in series (daisy chain connection) by using a cable. Specifically, a certain display device serves as a master device and is connected in a daisy chain in clockwise order, and data transfer is performed by a bucket brigade method. For example, the master device is disposed at the head (the forefront) in the case of daisy chain connection. However, the display device other than the master device functions as a slave device. For example, the cable is a cable for Thunderbolt (registered trademark) 3 or a cable for USB Type-C and may transmit and receive image data, operation input data, and the like. In such a multi-display, multiple input ports 420 and multiple output ports 440 are provided in the display device of a master device, and one of the input ports 420 and one of the output ports 440 are allocated to the master device and each of slave devices. Image data of the input port 420 allocated to each of the slave devices is transmitted from the master device. In addition, operation input data is transmitted from the slave device to the master device, and the master device distributes and outputs the operation input data received from the slave devices to the output port 440 allocated to the slave device. With a multi-display having such a configuration, it is possible to automatically combine the video input and the operation output by executing the above-described connection processing.

Further, specific numerical values, screen configurations, and the like mentioned in the above examples are merely examples and may be appropriately changed according to actual products.

In addition, if the same result may be obtained in each step of the flowchart described in the above examples, the order of processing may be appropriately changed.

The present disclosure contains subject matter related to that disclosed in Japanese Priority Patent Application JP 2017-205941 filed in the Japan Patent Office on Oct. 25, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device communicably connectable to each of two or more information terminals, the display device comprising:
   a display unit;
   two or more input ports corresponding respectively to the two or more information terminals and receiving a video signal transmitted from each of the two or more information terminals;
   two or more output ports corresponding respectively to the two or more information terminals and outputting an operation signal to each of the two or more information terminals; and a processor that causes the display unit to display a display screen including an image corresponding to the video signal input to at least one input port among the two or more input ports;

wherein the processor:
  displays the image corresponding to the video signal input on a divided area of the display screen,
  shifts to a connection processing state where a combination of the at least one input port and the two or more output ports is automatically set,
  causes each of the two or more output ports to sequentially output a detection signal for changing the image,
  detects a change of the image included in the display screen, and
  sets a combination of a setting output port from which the detection signal is output when the image has changed among the two or more output ports and the at least one input port to which the video signal corresponding to the image displayed on the display unit is input when the image has changed.

2. The display device according to claim 1,
wherein the display screen includes two or more sub-screens corresponding respectively to the two or more input ports,
the detection unit detects a setting sub-screen in which the image has changed among the two or more subscreens, and
the connection setting unit sets a combination of the setting output port and a setting input port corresponding to the setting sub-screen in which the image has changed among the two or more input ports.

3. The display device according to claim 2,
wherein the detection signal output unit causes the detection signal to be output from each of the two or more output ports when a screen configuration displayed on the display unit has changed.

4. The display device according to claim 1,
wherein the detection signal output unit causes the detection signal to be output from each of the two or more output ports when a predetermined user operation is performed.

5. The display device according to claim 1,
wherein the detection signal output unit causes the detection signal to be output from each of the two or more output ports when a connection state at the two or more input ports has changed.

6. A non-transitory storage medium storing a control program causing a computer of a display device communicably connectable to each of two or more information terminals and including a display unit, two or more input ports corresponding respectively to the two or more information terminals and receiving a video signal transmitted from each of the two or more information terminals, two or more output ports corresponding respectively to the two or more information terminals and outputting an operation signal to each of the two or more information terminals to execute a process comprising:

(a) causing the display unit to display a display screen including an image corresponding to the video signal input to at least one input port among the two or more input ports;
(b) displaying the image corresponding to the video signal input on a divided area of the display screen,
(c) shifting to a connection processing state where a combination of the at least one input port and the two or more output ports is automatically set,
(d) causing each of the two or more output ports to sequentially output a detection signal for changing the image;
(e) detecting a change of the image included in the display screen, and
(f) setting a combination of a setting output port from which the detection signal is output when the image has changed among the two or more output ports and the at least one input port to which the video signal corresponding to the image displayed on the display unit is input when the image has changed.

7. A control method, comprising:
causing a processor of a display device communicably connectable to each of two or more information terminals and including a display unit, two or more input ports corresponding respectively to the two or more information terminals and receiving a video signal transmitted from each of the two or more information terminals, two or more output ports corresponding respectively to the two or more information terminals and outputting an operation signal to each of the two or more information terminals to execute:

(a) causing the display unit to display a display screen including an image corresponding to the video signal input to at least one input port among the two or more input ports;
(b) displaying the image corresponding to the video signal input on a divided area of the display screen,
(c) shifting to a connection processing state where a combination of the at least one input port and the two or more output ports is automatically set,
(d) causing each of the two or more output ports to sequentially output a detection signal for changing the image;
(e) detecting a change of the image included in the display screen, and
(f) setting a combination of a setting output port from which the detection signal is output when the image has changed among the two or more output ports and the at least one input port to which the video signal corresponding to the image displayed on the display unit is input when the image has changed.

* * * * *